(12) United States Patent
Lechner et al.

(10) Patent No.: US 10,395,551 B2
(45) Date of Patent: Aug. 27, 2019

(54) SYSTEMS AND METHODS FOR AN IMMERSIVE SIMULATOR

(71) Applicant: The Boeing Company, Chicago, IL (US)

(72) Inventors: Robert James Lechner, St. Charles, MO (US); Elizabeth Marie Biddle, Orlando, FL (US)

(73) Assignee: THE BOEING COMPANY, Chicago, IL (US)

( * ) Notice: Subject to any disclaimer, the term of this patent is extended or adjusted under 35 U.S.C. 154(b) by 316 days.

(21) Appl. No.: 15/472,645

(22) Filed: Mar. 29, 2017

(65) Prior Publication Data

US 2018/0286269 A1    Oct. 4, 2018

(51) Int. Cl.
| | | |
|---|---|---|
| G09B 9/16 | (2006.01) | |
| G09B 9/28 | (2006.01) | |
| G09B 9/08 | (2006.01) | |

(52) U.S. Cl.
CPC ............ *G09B 9/165* (2013.01); *G09B 9/085* (2013.01); *G09B 9/28* (2013.01)

(58) Field of Classification Search
CPC ... G09B 9/00; G09B 9/04; G09B 9/06; G09B 9/08; G09B 9/085; G09B 9/16; G09B 9/165; G09B 9/28
See application file for complete search history.

(56) References Cited

U.S. PATENT DOCUMENTS

| 2007/0264617 A1 | 11/2007 | Richardson et al. |
| 2010/0092926 A1 | 4/2010 | Fabling |
| 2011/0076656 A1 | 3/2011 | Scott et al. |
| 2016/0293040 A1 | 10/2016 | Ireland |

FOREIGN PATENT DOCUMENTS

WO    WO 2007/109507 A2    9/2007

OTHER PUBLICATIONS

Extended European Search Report dated May 3, 2018 in corresponding European Application No. 18159158.7.
Kleven et al., "Training Nurses and Educating the Public Using a Virtual Operating Room with Oculus Rift," IEEE (2014).

*Primary Examiner* — Timothy A Musselman
(74) *Attorney, Agent, or Firm* — MH2 Technology Law Group LLP

(57) ABSTRACT

Systems, computer readable media, and method concern includes generating visual, auditory and other sensory depictions of a life-sized virtual crew member in an aircraft simulator. The virtual crew member simulates operational actions and behavioral and physiological responses of a crew member of an aircraft. The method includes collecting one or more responses of an operator using the aircraft simulator. The one or more responses comprise biofeedback data associated with the operator. The method includes generating, in response to the one or more responses, one or more simulated operational actions or simulated behavioral and physiological responses for the virtual crew member. The method includes collecting one or more additional responses of the operator. The one or more additional responses comprise additional biofeedback data of the operator that corresponds to an interaction with the one or more simulated operational actions or simulated behavioral and physiological responses for the virtual crew member.

20 Claims, 5 Drawing Sheets

SYSTEMS AND METHODS FOR AN IMMERSIVE SIMULATOR

BACKGROUND

Currently, simulators are utilized to train students in the operation of a vehicle and evaluate the operation of the vehicle. For example, aircraft simulators provide a simulated environment of an aircraft, such as a cockpit, for training and performance evaluation. Current simulators, however, are limited to simulating the operation of the vehicle. Thus, there is a need for simulators that provide a complete real-world environment including interactions with passengers of the vehicle.

SUMMARY

Aspects of the present disclosure concern a method that includes generating visual, auditory and other sensory depictions of a life-sized virtual crew member in an aircraft simulator. The virtual crew member simulates operational actions and behavioral and physiological responses of a crew member of an aircraft. The method also includes collecting data representing a state of the aircraft being simulated and one or more responses of an operator using the aircraft simulator. The one or more responses comprise biofeedback data associated with the operator. Additionally, the method includes generating, in response to at least one of the data representing the state of the aircraft and the one or more responses, one or more simulated operational actions or simulated behavioral and physiological responses for the virtual crew member. Further, the method includes collecting additional data representing a new state of the aircraft being simulated and one or more additional responses of the operator. The one or more additional responses comprise additional biofeedback data of the operator that corresponds to an interaction with the one or more simulated operational actions or simulated behavioral and physiological responses for the virtual crew member. The method also includes storing the one or more responses and the one or more additional responses as a log of the operator's use of the aircraft simulator.

Additional aspects of the present disclosure concern a system that includes a simulator configured to simulate operation of a craft or vehicle. The simulator includes one or more controls and displays, one or more biofeedback sensors, and a crew member simulator configured to simulate a passenger or crew member of a craft or vehicle. The system also includes one or more processors coupled to the simulator. The one or more processors are configured to execute the instructions, stored in one or more memory devices, to perform a method. The method includes generating, with the crew member simulator, visual, auditory and other sensory depictions of a life-sized virtual crew member in the simulator. The virtual crew member simulates operational actions and behavioral and physiological responses of the passenger or crew member of the craft or vehicle. The method also includes collecting, from the one or more controls and displays and the one or more biofeedback sensors, data representing a state of the craft or vehicle being simulated and one or more responses of an operator using the simulator. The one or more responses comprise biofeedback data associated with the operator. Additionally, the method includes generating, in response to at least one of the data representing the state of the craft or vehicle and the one or more responses, one or more simulated operational actions or simulated behavioral and physiological responses for the virtual crew member with the crew member simulator. The method also includes collecting, from the one or more controls and displays and the one or more biofeedback sensors, additional data representing a new state of the craft or vehicle being simulated and one or more additional responses of the operator. The one or more additional responses comprise additional biofeedback data of the operator that corresponds to an interaction with the one or more simulated operational actions or simulated behavioral and physiological responses for the virtual crew member. Further, the method includes storing the one or more responses and the one or more additional responses as a log of the operator's use of the simulator.

Additional aspects of the present disclosure concern a non-transitory computer readable medium storing instructions for causing one or more processors to perform a method. The method includes generating visual, auditory and other sensory depictions of a life-sized virtual crew member in an aircraft simulator. The virtual crew member simulates operational actions and behavioral and physiological responses of a crew member of an aircraft. The method also includes collecting data representing a state of the aircraft being simulated and one or more responses of an operator using the aircraft simulator. The one or more responses comprise biofeedback data associated with the operator. Additionally, the method includes generating, in response to at least one of the data representing the state of the aircraft and the one or more responses, one or more simulated operational actions or simulated behavioral and physiological responses for the virtual crew member. Further, the method includes collecting additional data representing a new state of the aircraft being simulated and one or more additional responses of the operator. The one or more additional responses comprise additional biofeedback data of the operator that corresponds to an interaction with the one or more simulated operational actions or simulated behavioral and physiological responses for the virtual crew member. The method also includes storing the one or more responses and the one or more additional responses as a log of the operator's use of the aircraft simulator.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
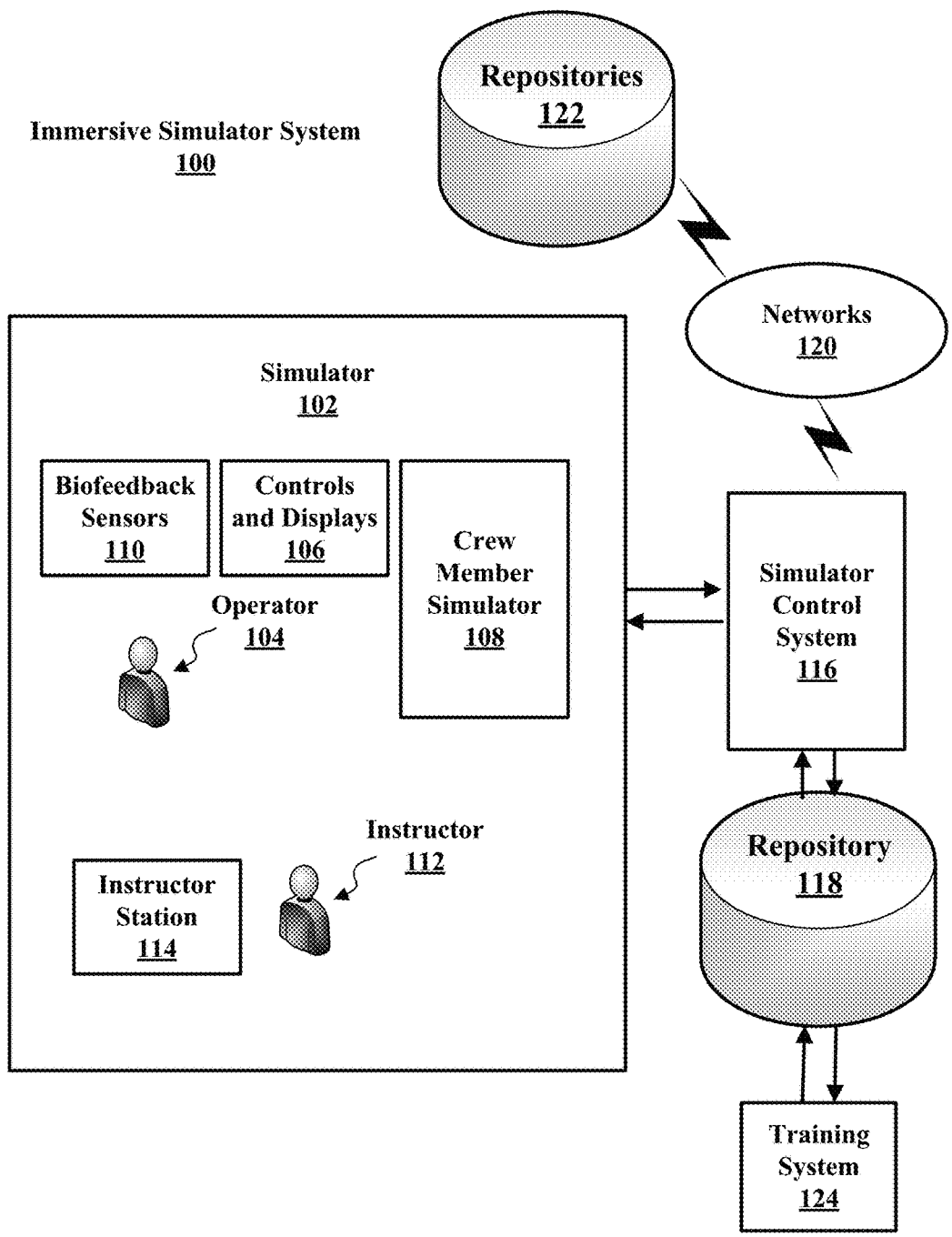
FIG. 1 illustrates an example of an immersive simulator, according to various aspects of the present disclosure.

FIG. 1 illustrates an immersive simulator system 100 in which real-world interactions of crew members can be simulated and the interactions can be recorded for training, according to aspects of the present disclosure. While FIG. 1 illustrates various components contained in the immersive simulator system 100, FIG. 1 illustrates one example of a simulator system and additional components can be added and existing components can be removed.

As illustrated in FIG. 1, the immersive simulator system 100 includes a simulator 102. The simulator 102 can be configured to provide a simulated and immersive environment of a vehicle for training and operation by an operator 104. A vehicle can be a craft, an aircraft, a motor vehicle, a ship, a locomotive, a space craft. For example, the simulator 102 can be an aircraft simulator, a motor vehicle simulator, a ship simulator, a locomotive simulator, a space craft simulator, and the like. The simulator 102 can include physical controls and displays, virtual controls and displays, and combinations thereof to simulate the operation and environment of a craft or vehicle, as discussed below.

The simulator 102 includes controls and displays 106. The controls and displays 106 provide user interfaces for operating the simulator 102 and outputting the responses and operations of the simulator 102 to the operator 104. In some examples, the controls and displays 106 can include physical controls and displays, virtual controls and displays, and combination thereof to simulate operation of the craft or vehicle simulated by the simulator 102. For example, if the simulator 102 is a motor vehicle simulator, the controls and displays 106 can include physical controls and displays such as a steering wheel, acceleration pedal, brake pedal, gear controls, speed display, fuel level display, engine temperature display, audio controls and the like. Likewise, for example, if the simulator 102 is a motor vehicle simulator, the controls and displays 106 can include virtual controls and displays such as a windshield display that displays a virtual, real-time environment in which the motor vehicle is operating.

The simulator 102 includes a crew member simulator 108. The crew member simulator 108 can be configured to simulate a crew member, passenger, or other live occupant (e.g., human) of a craft or vehicle simulated by the simulator 102. The crew member simulator 108 can be configured to simulate operational actions of the simulated crew member. Likewise, the crew member simulator 108 can be configured to simulate physical, behavioral, physiological, and emotional actions and responses of the simulated crew member. The crew member simulator 108 can be a physical device or system, a virtual device or system, and combinations thereof. For example, the crew member simulator 108 can be a physical device or system that simulates the crew member, such as an animatronic robot. Likewise, for example, the crew member simulator 108 can be a virtual system such as a virtual reality display, a holographic generator or holographic display, and the like that projects an image of the simulated crew member for viewing by the operator 104.

For example, if the simulator is a motor vehicle simulator and the operator 104 is the driver of the simulated motor vehicle, the crew member simulator 108 can simulate a crew member, or a passenger, of the motor vehicle. In this example, the crew member simulator 108 can simulate the physical actions and responses of the simulated passenger such as turning on the radio, changing environmental controls, conversing with the operator 104, and the like. Likewise, in this example, the crew member simulator 108 can simulate the emotional actions or responses of the crew member, or passenger, such as a surprise or shock response to a simulated accident, anger over a simulated argument, and the like. As such, the operator 104 can experience a complete, real-world simulation of operating the motor vehicle including real-world interactions with passengers of the motor vehicle. In an example, the crew member simulator 108 can simulate just the emotional actions and responses of the crew member or, alternatively, the crew member simulator 108 can simulate just the physical actions and responses of the simulated crew member.

The simulator 102 includes biofeedback sensors 110. The biofeedback sensors 110 can capture signals representing conscious and subconscious reactions, emotions, response, voice patterns, and the like of the operator 104. The reactions, emotions, response, and the like can be in response to the operation of the simulator 102 and can be in response to the interactions with the crew member simulated by the crew member simulator 108. The biofeedback sensors 110 can be any type of device that is capable of sensing or detecting actions, reactions, inputs, emotions, and the like of the operator 104. For example, the biofeedback sensors 110 can be configured to capture the biofeedback data including speech and sound data, scent data, brain wave data (e.g., electroencephalogram (EEG) data), eye movement tracking data, micro-facial expressions data, body language, vital sign data (heart rate, blood pressure, respiration rate, etc.), muscle movement data, capillary dilation data, skin conductivity data, and the like.

The simulator 102 can also accommodate an instructor 112 via an instructor station 114. The instructor station 114 can allow the instructor 112 to initiate and control operation of the simulator 102. For example, the instructor station 114 can provide user interfaces to allow the instructor to select and configure different scenarios for the simulator 102, select and configure simulated crew members, control and operate the simulator 102, monitor and evaluate the performance of the operator 104, provide feedback about the performance of the operator 104, and the like. For example by providing a performance rating. In another example, the instructor station 114 can allow the instructor 112 control and operate the crew member simulator 108 to communicate with the operator 104 and directly control the operational actions and the physical, behavioral, physiological, and emotional actions of the simulated crew member.

The immersive simulator system 100 also includes a simulator control system 116. The simulator control system 116 can be configured to control the operation of the simulator 102 and the generation of the simulated crew member by the crew member simulator 108. For example, the simulator control system 116 can include hardware, software, and combination thereof that communicate with the controls and displays 106 to simulate the environment and operation of the craft or vehicle that is the subject of the simulator 102. Likewise, for example, the simulator control system 116 can include hardware, software, and combination thereof that communicate with the biofeedback sensors 110 to capture and analyze the biofeedback data of the operator 104. Also, for example, the simulator control system 116 can include hardware, software, and combination thereof that communicate with the crew member simulator 108 to generate the simulated crew member and operate the simulated crew member, according to crew member models and in response to the operational actions and biofeedback data from the operator 104. Additionally, for example, the simulator control system 116 can include hardware, software, and combination thereof that communicate with the instructor station 114 to allow the instructor 112 to control and operate the simulator 102.

As discussed above, the simulator control system 116 can be implemented as hardware, software, and combination thereof. For example, the simulator control system 116 can be implemented as a simulator software program executing on one or more computer systems. The computer systems can be any type of conventional computer system that is operating in the immersive simulator system 100 or supporting the immersive simulator system 100. For example, the computer systems can include various types of servers, such as file servers, web servers, application servers, database servers, email servers and the like, that provide services within the immersive simulator system 100. Likewise, for example, the computer systems 102 can include laptop computers, desktop computers, tablet computers, mobile phones. In some examples, one or more components of the simulator control system 116 can be implemented in dedicated hardware.

Additionally, for example, the immersive simulator system 100 can include other hardware and computer systems that support the immersive simulator system 100. For example, the immersive simulator system 100 can include gateways, routers, wireless access points, firewalls, and the like that support any type of communications network to allow the computing systems in the immersive simulator system 100 to communicate. In any of the examples, the computer systems in the immersive simulator system 100 include hardware resources, such as processors, memory, network hardware, storage devices, and the like, and software resources, such as operating systems (OS), application programs, and the like.

In one example, the simulator control system 116 can include one or more simulation software programs that controls the operation of the simulator 102 and operation of the crew member simulator 108. The simulation software programs can be written in a variety of programming languages, such as JAVA, C++, Python code, Visual Basic, hypertext markup language (HTML), extensible markup language (XML), and the like to accommodate a variety of operating systems, computing system architectures, etc. In this example, the simulator software programs can control the operation of the simulator 102. For instance, the simulator software programs can interface with the controls and displays 106 of the simulator 102 to simulate the craft or vehicle for the operator, such as run a simulation scenario for the simulator 102, display and update the operational status of the simulated craft or vehicle, display and update the simulated environment in response to the operation by the operator 104, and the like.

Likewise, for example, the simulator software programs can generate and control the crew member simulator 108. The simulator software programs can generate, display, and control the simulated crew member on the crew member simulator 108. The simulator software programs can generate, display, and control the simulated crew member on the crew member simulator 108 autonomously based on one or more models of crew member behavior and actions, based on input from the instructor, and combination thereof. For example, the simulator software programs can generate different types and configuration of simulated crew members that reflect different ages, genders, cultures, races, physical appearance, and the like. Likewise, for example, the simulator software programs can control and modify the simulated crew member on the crew member simulator 108 so that the simulated crew member performs any one of reacts to the operator 104, reacts to the simulation scenario, follows input from the instructor 112, and combination thereof. Additionally, for example, the simulator software programs can control and modify the simulated crew member on the crew member simulator 108 so that the simulated crew member reacts to the biofeedback data of the operator 104. For instance, the simulator software can control and modify the simulated crew member to respond to the voice inflections of the operator 104, the speech phraseology of the operator 104, response to stress detected in the operator 104, and the like.

The immersive simulator system 100 includes a repository 118. The repository 118 can be configured to store data utilized by the simulator 102 and the simulator control system 116. For example, the repository 118 can store the operational parameters and data for the simulator that allows simulation of a craft or vehicle. Likewise, the repository 118 can store data generated by the simulator 102. For example, the repository 118 can store the biofeedback data captured by the biofeedback sensors 110, the actions performed by the operator 104 on the controls and displays 106, the actions performed by the simulated crew member, and input from the instructor 112 on the instructor station 114.

The immersive simulator system 100 include one or more repositories 122. The computer system 102 can be coupled to one or more repositories 122 via one or more networks 120. For example, the repositories 122 can be operated and maintained by the immersive simulator system 100 and/or other entities. The network 120 can be any type of network whether public or private. The repositories 122 can be configured to store data utilized by the simulator 102 and the simulator control system 116. For example, the repositories 122 can store the operational parameters and data for the simulator that allows simulation of a craft or vehicle. Likewise, the repositories 122 can store data generated by the simulator 102. For example, the repositories 122 can store the biofeedback data captured by the biofeedback sensors 110, the actions performed by the operator 104 on the controls and displays 106, the actions performed by the simulated crew member, and input from the instructor 112 on the instructor station 114.

The immersive simulator system 100 includes a training system 124. The training system 124 can be coupled to the repository 118 (and/or the repositories 122) to retrieve the data captured for the operator 104. The training system 124 can provide the data to the operator 104. For example, the training system 124 can provide a training summary to the operator 104 that includes a performance evaluation or rating of the operation of the simulator 102 and the interactions with the simulated crew member.

Using the components discussed above, the immersive simulator system 100 provide a standalone and/or instructor-influenced learning system that allows interjection of leadership, simulation and instruction of communication, crew resource management and interactive skill learning. The crew member simulator 108 provides an interactive simulation that invokes emotion and confrontation (e.g., disrespecting authority, lack of cooperation, beratement, embarrassment, etc.), for the operator 104 in simulator 102 and focuses on communication and other crew resource management competencies through verbal speech and body language to include facial expressions. As such, the immersive simulator system 100 can teach or allow practice of coping mechanisms and allow development of a mastery in personal skills in addition to operation training and evaluation. Additionally, the immersive simulator system 100 provides after action review to emphasize learning points.

Figure 2:
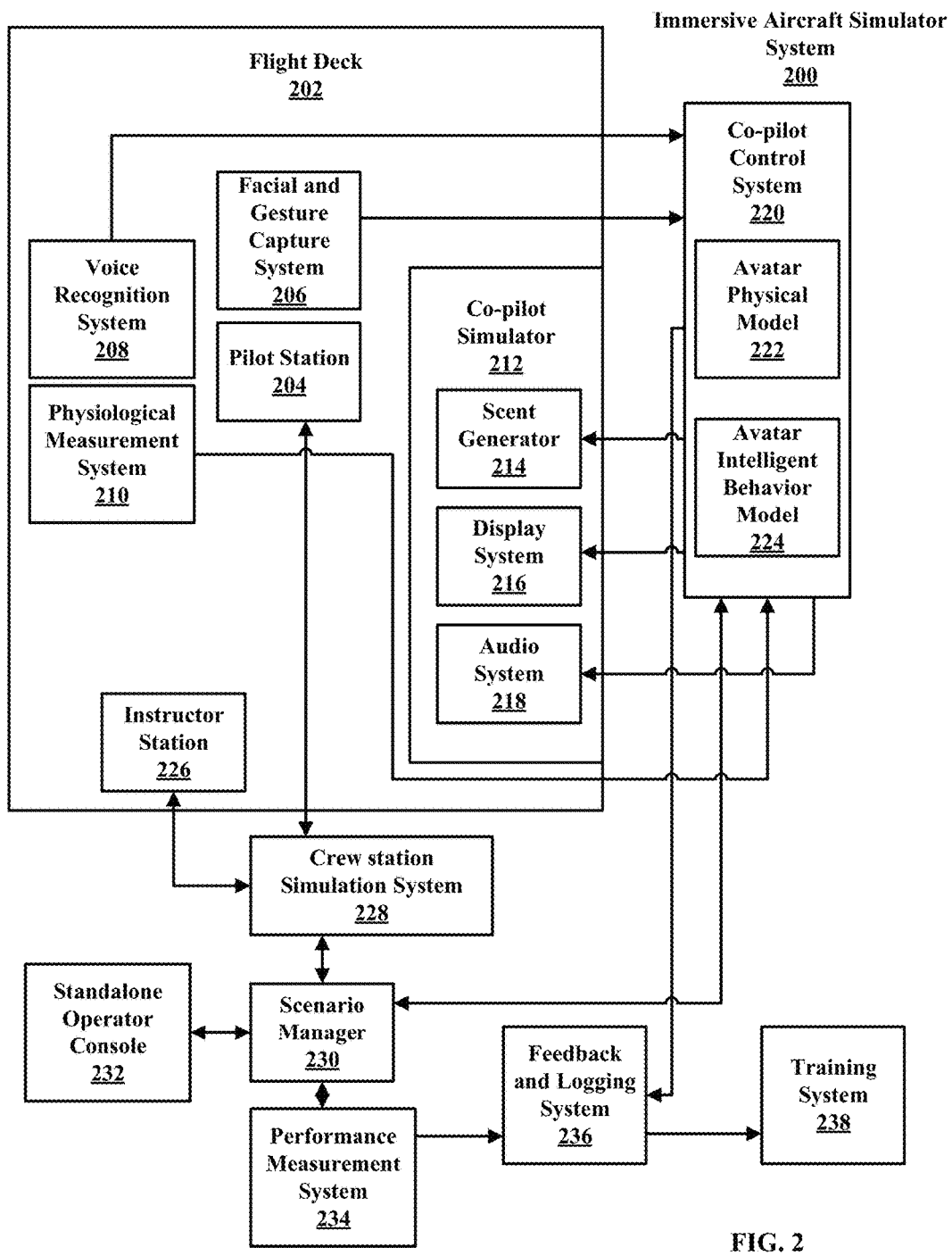
FIG. 2 illustrates an example of an immersive aircraft simulator, according to various aspects of the present disclosure.

As discussed above, the immersive simulator system 100 can provide a simulated and immersive environment of a craft or vehicle. FIG. 2 illustrates one example of an immersive simulator system 100, an immersive aircraft simulator system 200, in which real-world interactions of aircraft crew members can be simulated and the interactions can be recorded for training, according to aspects of the present disclosure. While FIG. 2 illustrates various components contained in the immersive aircraft simulator system 200, FIG. 2 illustrates one example of an aircraft simulator and additional components can be added and existing components can be removed.

The immersive aircraft simulator system 200 includes a flight deck 202. The flight deck 202 can be configured to simulate the environment of an aircraft flight deck. The flight deck 202 can include the systems, hardware, control, displays, and the like found on an aircraft flight deck. In examples, the flight deck 202 can be a flight training device and/or full flight simulator. Flight deck 202 can be implemented using any commercially available flight deck simulator along with modifications according to aspects described herein. In some examples, the flight deck 202 can be implemented using a flight deck simulator available from CAE, Inc. and/or Thales.

The flight deck 202 includes a pilot station 204. The pilot station 204 can include the systems, hardware, control, displays, and the like that simulates a pilot's control and operation of a simulated aircraft. For example, the pilot station 204 can include a seat, control stick or yolk, controls, flaps and elevator controls, electronic flight bag, and the like. Additionally, for example, the pilot station 204 can include displays such as a primary flight display, multifunction display, navigation display, head up display, and engine indicating and crew alerting system (EICAS) display. The primary flight display can provide information such as, for example, airspeed, altitude, heading, attitude, vertical speed, and glideslope. The multifunction display can provide status information about aircraft systems such as, for example, communications, auxiliary power unit (APU), fuel, and electrical systems. The navigation display can present heading/track, flight plan route, waypoint, airport, navigational aid and weather information. The head up display (HUD) can provide projected airplane flight data on the HUD combiner mounted just in front of the windshield. The EICAS display can present information about aircraft systems, including propulsion, warnings, flight controls, fuel, and air systems.

The flight deck 202 includes one or more devices and systems to capture biofeedback data. The biofeedback sensors can be any type of system that includes hardware, software, or combinations thereof and is capable of sensing or detecting actions, reactions, inputs, emotions, and the like of the operator 104. For example, the biofeedback sensors can be configured to capture the biofeedback data including speech and sound data, scent data, brain wave data (e.g., electroencephalogram (EEG) data), eye movement tracking data, micro-facial expressions data, body language, vital sign data (heart rate, blood pressure, respiration rate, etc.), muscle movement data, capillary dilation data, skin conductivity data, and the like.

For example, the biofeedback devices and system can include a facial and gesture capture system 206, a voice recognition system 208, and a physiological measurement system 210. The facial and gesture capture system 206 can be any type of system that includes hardware, software, or combinations thereof to detect, capture, and analyze facial gestures and body movements of the operator so that emotional and cognitive states of the operator can be determined. The voice recognition system 208 can be any type of system that includes hardware, software, or combinations thereof to detect, capture, and analyze the speech and sounds emitted by an operator or student. For instance, the voice recognition system 208 can analyze speech and sounds of the operator or student to detect the syntax and spoken words of the operator or student in order to identify speech directed to the simulation scenario and differentiate between actionable and non-actionable commands. Likewise, for instance, the voice recognition system 208 can analyze speech and sounds of the operator or student to detect the emotional aspects (e.g., inflection, tone, etc.) and interpolate the operator or student emotional state. The physiological measurement system 210 can be any type of system that includes hardware, software, or combinations thereof to detect, capture, and analyze physiological states of the operator or student (e.g., brainwaves, vital signs, capillary dilation, skin conductivity, etc.)

The flight deck 202 includes a co-pilot simulator 212. The co-pilot simulator 212 can be configured to simulate a co-pilot of an aircraft simulated by the simulator 102. The co-pilot simulator 212 can be configured to simulate the operational actions of the simulated co-pilot. Likewise, the co-pilot simulator 212 can be configured to simulate physical, behavioral, physiological, and emotional actions and responses of the simulated so-pilot. The co-pilot simulator 212 can be a physical device or system, a virtual device or system, and combinations thereof. For example, the co-pilot simulator 212 can be a physical device or system that simulates the co-pilot, such as an animatronic robot. Likewise, the co-pilot simulator 212 can be a virtual system such as a virtual reality display, an augmented reality display, a holographic generator, and the like that projects an image of the simulated crew member for the operator 104. While co-pilot simulator 212 is described as simulating a co-pilot, the co-pilot simulator 212 can be configured to simulate any crew member, passenger, or other live occupant (e.g., human) of an aircraft.

In one example, the co-pilot simulator 212 can include a scent generator 214, a display system 216, and an audio system 218. The scent generator 214 can be any type of system that includes hardware, software, or combinations thereof to generate scents and smells types found in a flight deck in different simulated scenarios and/or emitted from a crew member in different simulated scenarios. The display system 216 can be any type of system that includes hardware, software, or combinations thereof to display an image or avatar of the simulated crew member. For example, the display system 216 can be a virtual reality display (e.g., Hololens™, Occulus™, HTC Vive™, etc.), a conventional display or monitor (e.g., cathode ray tube display, liquid crystal display, plasma display, light emitting diode display, etc.), a holographic emitter, and the like. The audio system 218 can be can be any type of system that includes hardware, software, or combinations thereof to generate sounds found in a flight deck in different simulated scenarios and/or emitted from a crew member in different simulated scenarios. For example, the audio system 218 can be a speaker system, a headset (e.g., pilots communication headset), and the like.

The flight deck 202 includes an instructor station 226. The instructor station 226 can allow the instructor to initiate and control operation of the flight deck 202. For example, the instructor station 226 can provide user interfaces to allow the instructor to select and configure different scenarios for the flight deck 202, select and configure the simulated co-pilot, control and operate the flight deck 202, monitor and evaluate the performance of the operator or student, provide feedback about the performance of the operator or student, and the like. In another example, the instructor station 226 can allow the instructor to control and operate the co-pilot simulator 212 to communicate with the operator and directly control a portion, or all, of the operational actions and the physical, behavioral, physiological, and emotional actions of the simulated co-pilot.

The co-pilot simulator 212 and other systems, devices, and controls of the flight deck 202 are coupled to a co-pilot control system 220. The co-pilot control system 220 can include hardware, software, and combination thereof that communicate with the co-pilot simulator 212 to generate the simulated crew member and operate the simulated crew member according to crew member scenarios and in response to the operational actions and biofeedback data from the operator or student. The co-pilot control system 220 can generate, display and control the simulated co-pilot with the co-pilot simulator 212 autonomously based on one or more models of crew member behavior and action, based on input from the instructor, and combination thereof. For example, the co-pilot control system 220 can generate different types and configuration of simulated co-pilot that reflect different ages, genders, cultures, races, physical attributes, and the like. Likewise, for example, the co-pilot control system 220 can control and modify the simulated co-pilot with the co-pilot simulator 212 so that the simulated crew member reacts to the operator or student, reacts to the simulation scenario, follows input from the instructor, and combination thereof. Additionally, for example, the co-pilot control system 220 can control and modify the simulated co-pilot with the co-pilot simulator 212 so that the simulated co-pilot reacts to the biofeedback data of the operator or student. For instance, the co-pilot control system 220 can control and modify the simulated co-pilot to respond to the voice inflections of the operator or student, the speech phraseology of the operator or student, response to stress detected in the operator or student, and the like.

The co-pilot control system 220 can include avatar physical model 222 and an avatar intelligent behavior model 224. The avatar physical model 222 defines logic and data to support the physical rendering of the simulated co-pilot generated and displayed by the co-pilot simulator 212. The co-pilot control system 220 can maintain, store, and utilize different versions of the avatar physical model 222 that reflect different ages, genders, cultures, races, physical attributes, and the like. The avatar physical model 222 also defines motor movements, speech, head movements, facial responses, and the like that provide a perception of the simulated co-pilot interacting with the flight deck 202. The avatar physical model 222 also defines motor movements, speech, head movements, facial responses, and the like that provide realistic speech of the simulated co-pilot interacting with the operator or student. The avatar physical model 222 also defines motor movements, speech, head movements, facial responses, and the like that provide a perception of emotion in the simulated co-pilot.

The avatar intelligent behavior model 224 defines logic and data to support behavior and responses in order to simulate a cognitive state in the simulated co-pilot and generate realistic actions (e.g., conversation, emotions, physical task, etc.) to simulate the co-pilot in the scenarios. For instance, the avatar intelligent behavior model 224 can define behavior and responses to simulate expert pilot or co-pilot cognition and comprehension of flight deck 202 procedures and communications. Likewise, for instance, the avatar intelligent behavior model 224 can define behavior and responses that simulate actions in accordance with simulation scenarios and performance measure checkpoints. Also, for instance, the avatar intelligent behavior model 224 can define branching logic to invoke situations in the flight deck 202 (e.g., flight deck faults, equipment failures, crew communication issues, etc.) to allow measurement of the operator or student competencies. Further, for instance, the avatar intelligent behavior model 224 can define logic to recognize the cognitive and emotional state of the operator or student and respond to the cognitive and emotional state of the operator or student.

The avatar intelligent behavior model 224 (and/or the avatar physical model 222) also defines data output to support the operation of the immersive aircraft simulator system 200. For example, the avatar intelligent behavior model 224 (and/or the avatar physical model 222) outputs data to the co-pilot simulator 212 in order to respond to and to generate verbal communication, for instance, syntax and spoken words and voice inflection to indicate realistic behavior and emotion. Also, for example, the avatar intelligent behavior model 224 (and/or the avatar physical model 222) outputs data to the co-pilot simulator 212 in order to respond to and to generate non-verbal communication (e.g., facial expressions, gestures, etc.). Additionally for example, the avatar intelligent behavior model 224 (and/or the avatar physical model 222) outputs data to the co-pilot simulator 212 in order to generate olfactory cues (e.g., variance in hygiene, bodily function, etc.) and generate physical movement. The avatar intelligent behavior model 224 (and/or the avatar physical model 222) also receives input in order to simulate real-world interactions. For example, the avatar intelligent behavior model 224 (and/or the avatar physical model 222) can any one of receive data from the facial and gesture capture system 206, receive data from the voice recognition system 208, receive data from the physiological measure system 210, receive data from systems controlling the simulation scenario, receive data from an instructor or other user, and any combination thereof, and the like.

The immersive aircraft simulator system 200 also includes a crew station simulation system 228. The crew station simulation system 228 can be coupled to the pilot station 204 and the instructor station 226. The crew station simulation system 228 can be configured to manage and control the input and output of data to the pilot station 204 to simulate conditions in the flight deck 202.

The immersive aircraft simulator system 200 also includes a scenario manager 230. The scenario manager 230 can be coupled to the co-pilot control system 220, the crew station simulation system 228, a standalone operator console 232, and a performance measurement system 234. The scenario manager 230 includes logic, commands, instructions, and the like to provide and mange scenario data, vehicle simulation events, and state data provided to the components of the immersive aircraft simulator system 200. For example, the scenario manager 230 can provide an interface with a data daemon of the crew station simulation system 228 to read and write simulation data and load scenario profiles. Also, for example, the scenario manager 230 can provide an interface to the co-pilot control system 220 to provide simulation and scenario data and feedback simulation trigger event to the crew station simulation system 228. Additionally, for example, the scenario manager 230 can provide an interface to the performance measurement system 234 to provide simulation data, operator or student actions, instructor input, and the like. Also, for example, the scenario manager 230 can provide an interface to the standalone operator console 232 to display data from the simulation and trigger override of intelligent agent actions.

The standalone operator console 232 can provide an interface for an instructor or other user to initiate, configure, and operate the components of the immersive aircraft simulator system 200. The standalone operator console 232 can include hardware, software, and combination thereof to provide the interface to the instructor or other user.

The performance measurement system 234 collects the data generated by the immersive aircraft simulator system 200 and determines a performance measure for the operator or student. The performance measurement system 234 can provide a user interface to create objective measure of student performance. For example, the performance measurement system 234 can provide a user interface to specify algorithms that use simulator data that evaluate the operator or student performance against a predefined standard. For example, a standard can be a predetermined level of performance in the combination of operating the aircraft simulator and biofeedback, and interactions with the virtual crew member. Also, for example, the performance measurement system 234 can provide a user defined trigger event to define when metrics for the operator or student should be evaluated. The performance measurement system 234 includes logic to use simulation data to perform evaluation of predefined measures of performance. For example, the performance measurement system 234 can include logic to collect and annotate data from the immersive aircraft simulation system 200 to include ownership of performance characteristics (e.g., speed, altitude, etc.). For example, the performance measurement system 234 can include logic to collect, evaluate, and annotate the operator or student interaction with the flight deck 202 (e.g., button presses, throttle control) and interaction with the simulated co-pilot. The performance measurement system 234 includes logic to send performance measures to other systems such as the standalone operator console 232 and a feedback and logging system 236.

The immersive aircraft simulator system 200 also includes the feedback and logging system 236. The feedback and logging system 236 can be coupled to the co-pilot control system 220, the performance measurement system 234, and a training system 238. The feedback and logging system 236 provides performance feedback to the operator or student, for example, via the training system 238. The feedback and logging system 236 can automatically provide verbal or visual indications of performance and progress, automatically provide verbal and visual recommendations of action to improve performance, and the like. Also, for example, the feedback and logging system 236 can automatically highlight an area in the simulation (e.g., altimeter) to direct the operator or student to focus on an instrument or other part of the flight deck 202 to correct performance. Also, for example, the feedback and logging system 236 can automatically adjust the simulator (e.g., adjust speed or altitude) based on the assessment of the operator or student performance. Also, for example, the feedback and logging system 236 can generate and provide a training summary such as a graphical, tabular, numerical indication of the operator or student performance including the performance measures results. The feedback and logging system 236 also stores any data from the immersive aircraft simulator 200, the training summary, and the performance measures.

Figure 3:
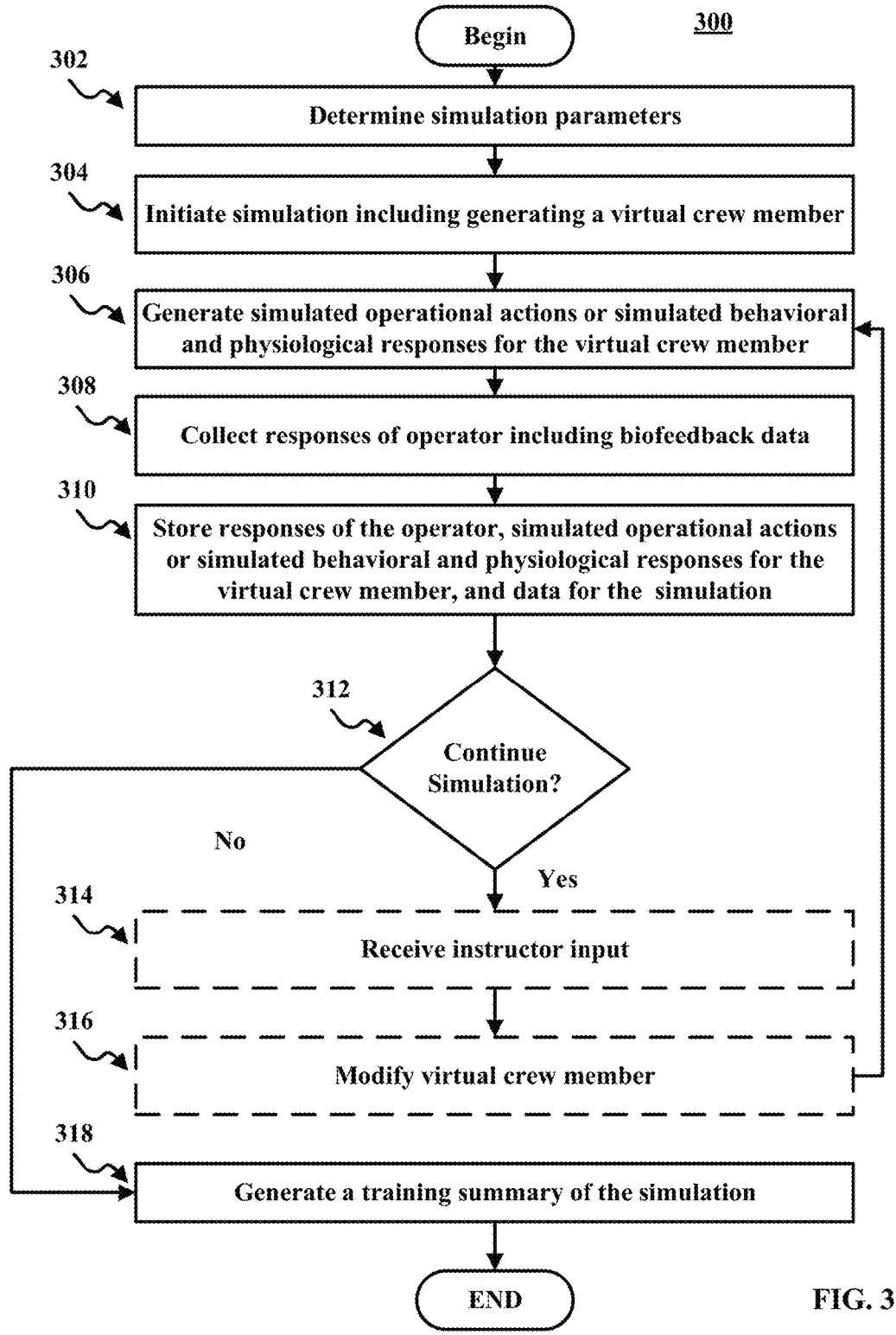
FIG. 3 illustrate an example of a process for operating an immersive simulator, according to various aspects of the present disclosure.

FIG. 3 illustrates an example of a process for providing and operating an immersive simulator, according to aspects of the present disclosure. While FIG. 3 illustrates various stages that can be performed, stages can be removed and additional stages can be added. Likewise, the order of the illustrated stages can be performed in any order.

After the process begins, in 302, simulation parameters are determined. The simulation parameters can include any data to initiate and operate the immersive simulator system 100 or the immersive aircraft simulator system 200. For example, the simulation parameters can include a simulation scenario, configuration parameters for the simulation, models for the crew member simulator, configuration parameters for the crew member simulator, and the like. In examples, one or more of the simulation parameters can be input by the instructor 112 (or other user). In example, one or more of the simulation parameters can be predefined in the immersive simulator system 100 or the immersive aircraft simulator system 200.

In 304, the simulation including the simulated crew member or virtual crew member is initiated. Once the simulation parameters are determined, the simulator control system 116 can initiate the simulator 102. For example, the simulator control system 116 can initiate the controls and displays 106 with initial status information based on the simulation scenario and begin receiving input from the operator 104. Additionally, for example, the simulator control system 116 can initialize the biofeedback sensors 110 and begin receiving biofeedback data from the operator 104. Additionally, for example, the simulator control system 116 can initialize the crew member simulator 106 based on the crew member models and begin generate the simulated crew member for interaction with the operator 104. Additionally, for example, the simulator control system 116 can initialize the instructor station 114 and begin receiving input from the instructor 112. Additionally, for example, the simulator control system 116 can begin storing data from the simulator 102 in the repository 118 and/or the repositories 122.

In 306, the immersive simulator system generates simulated operational actions or simulated behavioral and physiological responses for the virtual crew member. For example, based on the simulation scenario, the simulation control system 116 generates and modifies the appearance and operational action to conform to the operation of the simulator 102. For instance, in a simulation for the immersive aircraft simulator system 200, the co-pilot control system 220 generates and modifies the appearance and operational actions, for example, interacting in preflight checks with the operator or student, moving or operating controls, conversing with the operator or student, and the like. Additionally, for instance, in a simulation for the immersive aircraft simulator system 200, the co-pilot control system 220 generates and modifies simulated behavioral and physiological responses for the virtual crew member, for example, facial expressions and increased visible sweat on the crew member's forehead.

In 308, the immersive simulator system collects responses of the operator including biofeedback data. In 310, the immersive simulator system stores responses of the operator, simulated operation actions or simulated behavioral and physiological responses for the virtual crew member, and data for the simulation. For example, the simulator control system 116 can capture input from the operator 104, for instance, interactions with the controls and displays 106.

Additionally, for example, the simulator control system 116 receive, from the biofeedback sensors 110, biofeedback data from the operator 104. Additionally, for example, the simulator control system 116 can record the simulated operational action or simulated behavioral and physiological responses for the virtual crew member. Additionally, for example, the simulator control system 116 can receive input from the instructor 112. Additionally, for example, the simulator control system 116 can store data from the simulator 102 in the repository 118 and/or the repositories 122.

In 312, the immersive simulator system determines whether to continue the simulation. For example, the simulation can continue for a predetermined amount of time, until a simulation scenario is completed, until stopped by an event (e.g., crash of the craft or vehicle), until stopped by an instructor or other user, and the like. If the simulation is complete, the immersive simulator system can generate a training summary of the simulation. The training summary can include data from the simulation such as the action of the operator 104, interactions with the simulated crew member, operational and simulation parameters, a video and audio recording of the simulation, and the like. The training summary can also include one or more performance metrics. The performance metrics can be performance metrics associated with the operation of the simulator 102, associated with interaction with the simulated crew member, and the like. The performance metrics can be automatically generated by the immersive simulator system 100 or the immersive aircraft simulator system 200, can be based at least partially on input from an instructor or other user, and the like. After, the method 300 can end.

If the simulation continues, in 314, the immersive simulator system can optionally receive input from an instructor. For example, the instructor 112 can provide input regarding the performance of the operator 104, events to occur during the simulation, behavior and action of the simulated crew member, and the like.

In 316, the immersive simulator system can optionally modify the virtual crew member. For example, the appearance, emotion state, actions and the like can be modified. The virtual crew member can be modified based on the biofeedback data from the operator 104, input form the instructor 112, events in the simulation scenario, and the like. After, the method 300 return to 306 and repeats.

Figure 4:
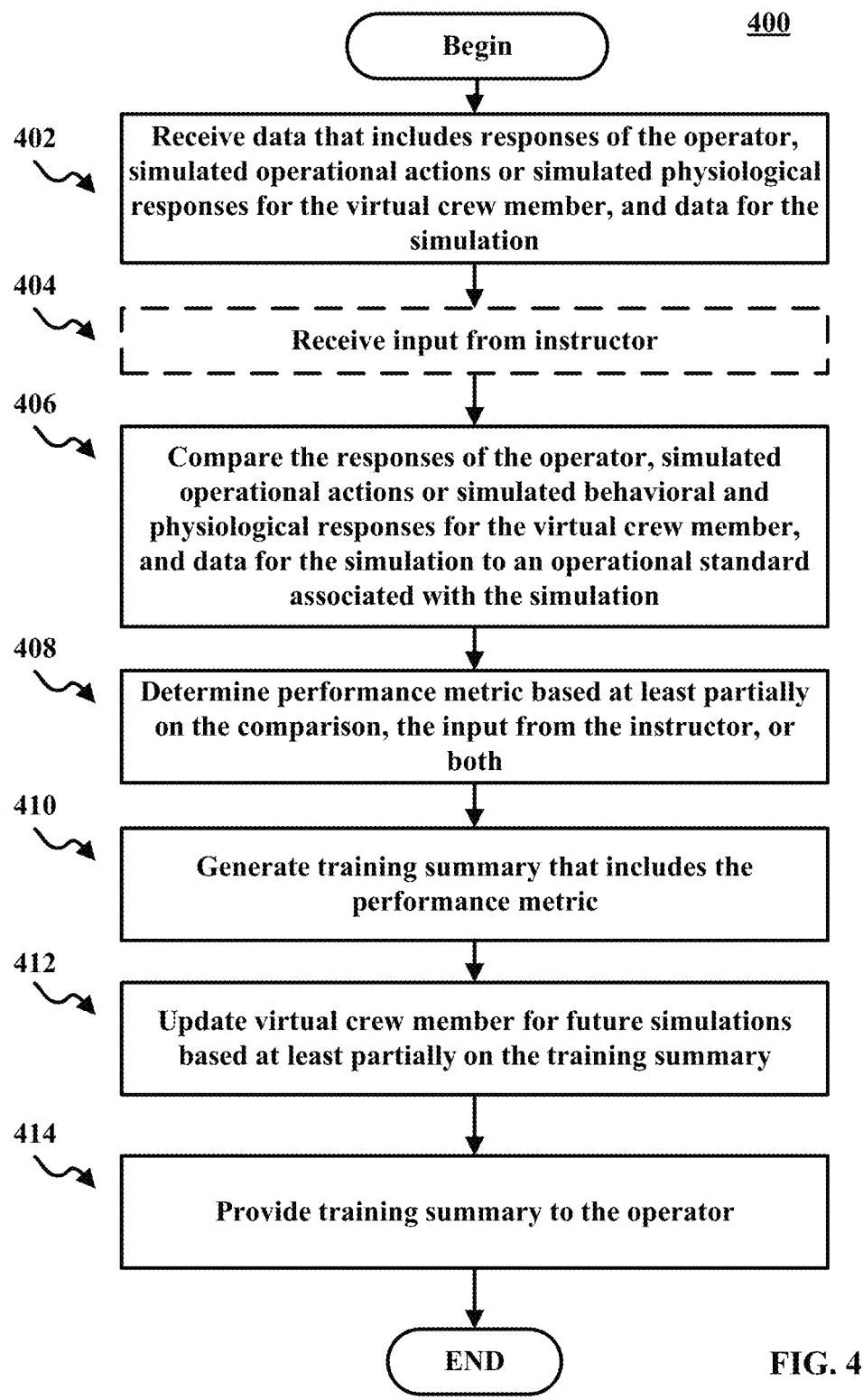
FIG. 4 illustrate an example of a process for utilizing data generated by an immersive simulator, according to various aspects of the present disclosure.

FIG. 4 illustrates an example of a process for utilizing data generated by an immersive simulator, according to aspects of the present disclosure. While FIG. 4 illustrates various stages that can be performed, stages can be removed and additional stages can be added. Likewise, the order of the illustrated stages can be performed in any order.

After the process begins, in 402, data is received that includes responses of the operator, simulated operational actions or simulated behavioral and physiological responses for the virtual crew member, and data for the simulation. In one example, the simulator control system 116 can receive the data. In another example, the performance measurement system and/or the feedback and logging system 236 can receive the data.

In 404, optionally, input can be received from an instructor. The input can include performance evaluation of the operator or student during operation of the simulator 102 or flight deck 202, interaction with the simulated crew member or simulated co-pilot, and the like. For example, the instructor 112 can provide input regarding the performance of the operator 104, events to occur the simulation, behavior and action of the simulated crew member, and the like.

In 406, the responses of the operator, simulated operational actions or simulated behavioral and physiological responses for the virtual crew member, and data for the simulation are compared to an operational standard associated with the simulation. In 408, a performance metric is determined based at least partially on the comparison, the input from the instructor, or both.

For example, the simulator control system 116 (or the performance measurement system 234) collects the data generated by the immersive simulator system 100 (the immersive aircraft simulator system 200) and determines performance measures for the operator or student. The simulator control system 116 (or the performance measurement system 234) can utilize objective measure of student performance. For example, the simulator control system 116 (or the performance measurement system 234) can utilize algorithms that use simulator data that evaluate the operator or student performance against a predefined standard, instructions input, and combination thereof. Also, for example, the simulator control system 116 (or the performance measurement system 234) can utilize trigger events to define when metrics for the operator or student should be evaluated. For example, the simulator control system 116 (or the performance measurement system 234) can collect and annotate data from the immersive aircraft simulation system 200 to include ownership of performance characteristics (e.g., speed, altitude, etc.), the operator or student interaction with the flight deck 202 (e.g., button presses, throttle control) and interaction with the simulated co-pilot.

For example, the feedback and logging system 236 can automatically provide verbal or visual indications of performance and progress, automatically provide verbal and visual recommendations of action to improve performance, and the like. Also, for example, the feedback and logging system 236 can automatically highlight an area in the simulation (e.g., altimeter) to direct the operator or student to focuses on an instrument or other part of the flight deck 202 to correct performance. Also, for example, the feedback and logging system 236 can automatically adjust the simulator (e.g., adjust speed or altitude) based on the assessment of the operator or student performance.

In 410, a training summary is generated that includes the performance metric. The training summary can include data from the simulation such as the action of the operator 104, interactions with the simulated crew member, operational and simulation parameters, a video and audio recording of the simulation, and the like. The training summary can also include one or more performance metrics. In examples, the video and audio recording of the simulation can include verbal or visual indications of performance and progress, highlighted areas in the simulation to direct the operator or student to focuses on an instrument or other part of the flight deck to correct performance, and the like.

In 412, the virtual crew member is updated for future simulations based at least partially on the training summary. For example, based on the operator's interaction with simulated crew member, the models of the simulated crew member can be updated to improve the real-world appearance and interactions of the simulated crew member.

In 414, the training summary is provided to the operator. In one example, the training summary can be provided via the training system 124. In another example, the training summary can be provided via the training system 238.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
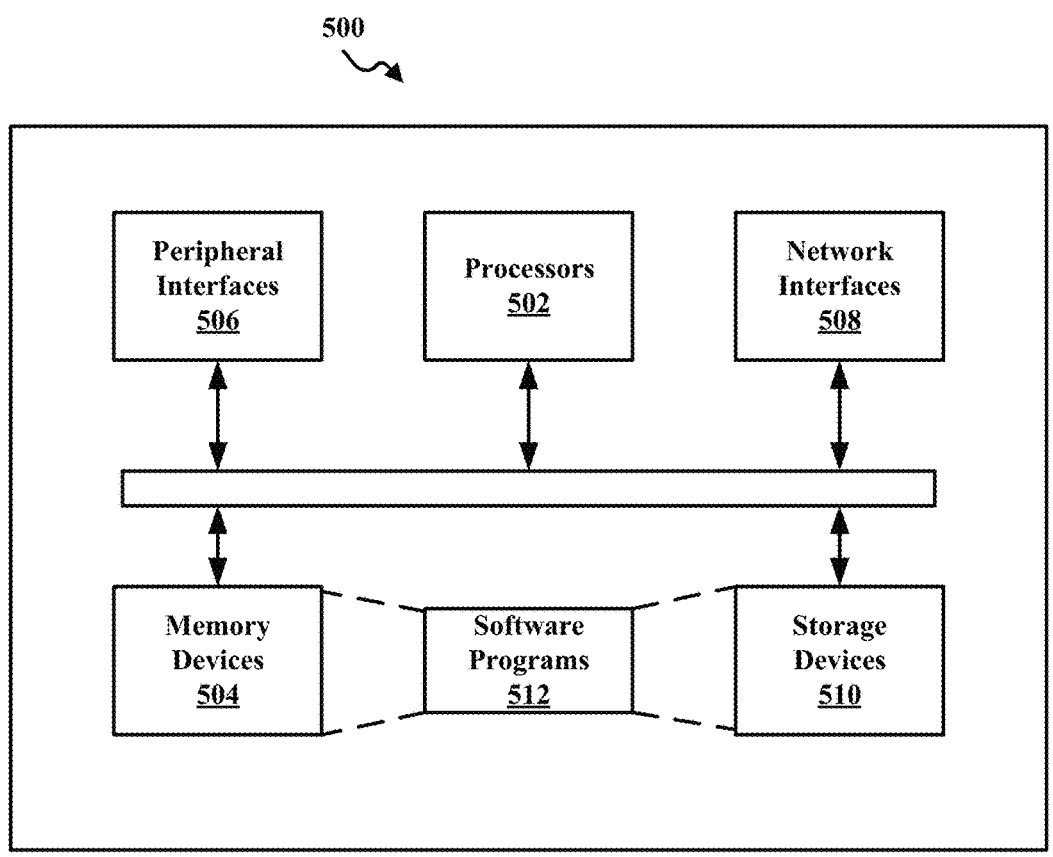
FIG. 5 illustrates an example of a hardware configuration for a computer device, according to various aspects of the present disclosure.

For example, FIG. 5 illustrates an example of a hardware configuration for the computer system that can be used in any of the components of the immersive simulator system 100 or immersive simulator system 200. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the simulation can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, for example the network 120, such as Ethernet adapters, wireless transceivers, or serial network components, for communicating over wired or wireless media using protocols. The computer device 500 can also include one or more storage devices 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the simulation environment described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise a random access memory (RAM), a read only memory (ROM), a flash memory, an electrically erasable programmable read only memory (EEPROM), a compact disc read only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method (300), comprising:
generating (304) visual, auditory and other sensory depictions of a life-sized virtual crew member in an aircraft simulator, wherein the virtual crew member simulates operational actions and behavioral and physiological responses of a crew member of an aircraft;
collecting (308) data representing a state of the aircraft being simulated and one or more responses of an operator during operation of the aircraft simulator, wherein the one or more responses comprise biofeedback data associated with the operator;
generating (306), in response to at least one of the data representing the state of the aircraft and the one or more responses, one or more simulated operational actions or simulated behavioral and physiological responses for the virtual crew member;
collecting (308) additional data representing a new state of the aircraft being simulated and one or more additional responses of the operator, wherein the one or more additional responses comprise additional biofeedback data of the operator that corresponds to an interaction with the one or more simulated operational actions or simulated behavioral and physiological responses for the virtual crew member; and
storing (310) the one or more responses and the one or more additional responses as a log of the operator's operation of the aircraft simulator.

2. The method (300) of claim 1, the method further comprising:
updating (316) the one or more simulated operational actions or simulated behavioral and physiological responses of the virtual crew member based at least partially on the log of the operator's operation of the aircraft simulator.

3. The method of claim 1, the method further comprising:
receiving (314) input from an instructor, wherein the instructor comprises a human or a computer supervising the aircraft simulator and wherein the one or more simulated operational actions or simulated behavioral and physiological responses for the virtual crew member are based at least partially on the input from the instructor.

4. The method (300) of claim 1, the method further comprising:
generating (318) a training summary based at least partially on the log of the operator's operation of the aircraft simulator.

5. The method (300, 400) of claim 4, the method further comprising:
comparing (406) the one or more responses and the one or more additional responses to an operational standard of the aircraft simulator;
determining (408), based at least partially on the comparing, a performance rating of the operator's operation of the aircraft simulator; and
providing (414) the performance rating as a portion of the training summary.

6. The method of claim 5, wherein the performance rating is based at least partially on input from an instructor and wherein the instructor comprises a human or a computer.

7. The method of claim 1, wherein the biofeedback data and the additional biofeedback data comprise collected facial gestures of the operator, captured speech of the operator, and captured behavioral and physiological responses of the operator.

8. A system (100), comprising:
a simulator (102) configured to simulate operation of a craft or vehicle, the simulator (102) comprising:
one or more controls and displays (106),
one or more biofeedback sensors (110), and
a crew member simulator (108) configured to simulate a passenger or crew member of a craft or vehicle; and
one or more processors (502) coupled to the simulator (102) and configured to execute instructions, stored in one or more memory devices (504), to perform a method (300) comprising:
generating (304), with the crew member simulator (108), visual, auditory and other sensory depictions of a life-sized virtual crew member in the simulator (102), wherein the virtual crew member simulates operational actions and behavioral and physiological responses of the passenger or crew member of the craft or vehicle;
collecting (308), from the one or more controls and displays (106) and the one or more biofeedback sensors (110), data representing a state of the craft or vehicle being simulated and one or more responses of an operator (104) using the simulator (102), wherein the one or more responses comprise biofeedback data associated with the operator (104);
generating (306), in response to at least one of the data representing the state of the craft or vehicle and the one or more responses, one or more simulated operational actions or simulated behavioral and physiological responses for the virtual crew member with the crew member simulator (108);
collecting (308), from the one or more controls and displays (106) and the one or more biofeedback sensors (110), additional data representing a new state of the craft or vehicle being simulated and one or more additional responses of the operator (104), wherein the one or more additional responses comprise additional biofeedback data of the operator (104) that corresponds to an interaction with the one or more simulated operational actions or simulated behavioral and physiological responses for the virtual crew member; and storing (310) the one or more responses and the one or more additional responses as a log of the operator's operation of the simulator (102).

9. The system (100) of claim 8, the method further comprising:
updating (316) the one or more simulated operational actions or simulated behavioral and physiological responses of the virtual crew member based at least partially on the log of the operator's operation of the simulator (102).

10. The system (100) of claim 8, wherein the simulator (102) further comprises an instructor station (114) and wherein the method further comprises:
receiving (314), via the instructor station (114), input from an instructor (112), wherein the instructor (112) comprises a human or a computer supervising the simulator (102) and wherein the one or more simulated operational actions or simulated behavioral and physiological responses for the virtual crew member are based at least partially on the input from the instructor (112).

11. The system (100) of claim 8, the method further comprising:
generating, to the operator, a training summary based at least partially on the log of the operator's operation of the simulator (102).

12. The system (100) of claim 11, the method (300, 400) further comprising:
comparing (406) the one or more responses and the one or more additional responses to an operational standard of the simulator (102);
determining (408), based at least partially on the comparison, a performance rating of the operator's operation of the simulator (102); and
providing (414) the performance rating as a portion of the training summary.

13. The system (100) of claim 8, wherein the crew member simulator (108) comprises at least one of an animatronic robot, a virtual reality display, and a holographic display.

14. The system (100) of claim 8, wherein the biofeedback data and the additional biofeedback data comprise captured facial gestures of the operator (104), captured speech of the operator (104), and captured behavioral and physiological responses of the operator (104).

15. A non-transitory computer readable medium (510) storing instructions for causing one or more processors to perform a method (300), the method comprising:
generating (304) visual, auditory and other sensory depictions of a life-sized virtual crew member in an aircraft simulator, wherein the virtual crew member simulates operational actions and behavioral and physiological responses of a crew member of an aircraft;
collecting (308) data representing a state of the aircraft being simulated and one or more responses of an operator using the aircraft simulator, wherein the one or more responses comprise biofeedback data associated with the operator;
generating (306), in response to at least one of the data representing the state of the aircraft and the one or more responses, one or more simulated operational actions or simulated behavioral and physiological responses for the virtual crew member;
collecting (308) additional data representing a new state of the aircraft being simulated and one or more additional responses of the operator, wherein the one or more additional responses comprise additional biofeedback data of the operator that corresponds to an interaction with the one or more simulated operational actions or simulated behavioral and physiological responses for the virtual crew member; and
storing (310) the one or more responses and the one or more additional responses as a log of the operator's operation of the aircraft simulator.

16. The non-transitory computer readable medium (510) of claim 15, the method further comprising:
updating (316) the one or more simulated operational actions or simulated behavioral and physiological responses of the virtual crew member based at least partially on the log of the operator's operation of the aircraft simulator.

17. The non-transitory computer readable medium (510) of claim 15, the method further comprising:
receiving (314) input from an instructor, wherein the instructor comprises a human or a computer supervising the aircraft simulator and wherein the one or more simulated operational actions or simulated behavioral and physiological responses for the virtual crew member are based at least partially on the input from the instructor.

18. The non-transitory computer readable medium (510) of claim 15, the method further comprising:
providing, to the operator, a training summary based at least partially on the log of the operator's operation of the aircraft simulator.

19. The non-transitory computer readable medium (510) of claim 18, the method (300, 400) further comprising:
comparing (406) the one or more responses and the one or more additional responses to an operational standard of the aircraft simulator;
determining (408), based at least partially on the comparison, a performance rating of the operator's of the aircraft simulator; and
providing (414) the performance rating as a portion of the training summary.

20. The non-transitory computer readable medium (510) of claim 15, wherein the biofeedback data and the additional biofeedback data comprise captured facial gestures of the operator, captured speech of the operator, and captured behavioral and physiological responses of the operator.

* * * * *